US011183746B2

(12) United States Patent
Moore

(10) Patent No.: US 11,183,746 B2
(45) Date of Patent: Nov. 23, 2021

(54) REFLECTIVE MICROSTRIP TUNING CIRCUIT

(71) Applicant: Raytheon Company, Waltham, MA (US)

(72) Inventor: Gary Ian Moore, Tewksbury, MA (US)

(73) Assignee: Raytheon Company, Waltham, MA (US)

( * ) Notice: Subject to any disclaimer, the term of this patent is extended or adjusted under 35 U.S.C. 154(b) by 238 days.

(21) Appl. No.: 16/446,018

(22) Filed: Jun. 19, 2019

(65) Prior Publication Data

US 2020/0403290 A1 Dec. 24, 2020

(51) Int. Cl.
*H01P 5/04* (2006.01)
*H01P 7/08* (2006.01)
(Continued)

(52) U.S. Cl.
CPC ............... *H01P 5/04* (2013.01); *H01P 1/184* (2013.01); *H01P 7/082* (2013.01); *H01P 7/088* (2013.01); *H01Q 3/44* (2013.01); *H04B 1/68* (2013.01)

(58) Field of Classification Search
CPC .... H01P 1/18; H01P 1/184; H01P 5/04; H01P 5/12; H01P 5/16; H01P 5/184; H01P 5/22;
(Continued)

(56) References Cited

U.S. PATENT DOCUMENTS 3,423,699 A * 1/1969 Hines ...................... H01P 1/185
333/164
3,611,199 A * 10/1971 Safran ...................... H01P 1/185
333/109
(Continued)

OTHER PUBLICATIONS

Cheng et al.; "Compact Reflective Microstrip Phase Shifter for Traveling Wave Antenna Applications"; IEEE Microwave and Wireless Components Letters, vol. 16, No. 7, Jul. 2006, pp. 431-433. (Year: 2006).*
(Continued)

*Primary Examiner* — Barbara Summons
(74) *Attorney, Agent, or Firm* — Renner, Otto, Boisselle & Sklar, LLP

(57) ABSTRACT

A reflective microstrip tuning circuit that operatively couples to another circuit to be tuned, in which tuning circuit receives an incident signal from the other circuit and enables adjustment of the amplitude and/or phase of the return signal reflected by the tuning circuit for use in the other circuit. The tuning circuit includes one or more cascaded couplers that divide power from the incident signal unequally among a plurality of adjustable tuning arms, in which the tuning arms may be individually adjusted to change the phase of the signal that is reflected by each arm so that both the amplitude and phase of the signal returned by the tuning circuit is adjusted to achieve the desired tuning result. The difference in the power that is divided among the tuning arms provides a progressive weighting to the adjustment effect of each tuning arm, which provides for a series of coarse through
(Continued)

fine adjustments that enables a greater degree of resolution when tuning.

16 Claims, 4 Drawing Sheets

(51) Int. Cl.
*H01Q 3/44* (2006.01)
*H01P 1/18* (2006.01)
*H04B 1/68* (2006.01)

(58) Field of Classification Search
CPC .......... H01P 5/227; H01P 7/082; H01P 7/088; H01P 7/18; H01P 7/20; H01Q 3/44; H04B 1/68
USPC ....... 333/161, 156, 139, 127, 125, 120, 117, 333/115, 111, 109, 205
See application file for complete search history.

(56) References Cited

U.S. PATENT DOCUMENTS

| | | | | |
|---|---|---|---|---|
| 3,842,419 A | * | 10/1974 | Arndt | G01S 11/04 342/458 |
| 5,757,248 A | * | 5/1998 | Bardal | H03H 9/14597 333/33 |
| 10,243,246 B2 | * | 3/2019 | Laighton | H01P 1/184 |
| 2002/0153967 A1 | | 10/2002 | Nakada | |
| 2009/0224848 A1 | | 9/2009 | Lindmark | |
| 2018/0164500 A1 | | 6/2018 | Van Orden | |
| 2019/0036189 A1 | * | 1/2019 | Laighton | H01P 1/184 |

OTHER PUBLICATIONS

Ocera et al.; "A MEMS Programmable Power Divider/Combiner for Reconfigurable Antenna Systems"; IEEE 2005 European Microwave Conference, Paris, France, Conference Date Oct. 4-6, 2005, 4 pages and 1 IEEE Xplore abstract page. (Year: 2005).*
Padilla, P; Valenzuela-Valdés, J. F.; Padilla, J. L.; Fernández-González, J. M.; and M. Sierra-Castañer; Electronically Reconfigurable Reflective Phase Shifter for Circularly Polarized Reflectarray Systems; IEEE Microwave and Wireless Components Letters, vol. 26, No. 9, Sep. 2016.
International Search Report and Written Opinion for corresponding International Application No. PCT/US2020/035162 dated Sep. 23, 2020.
Zhou et al.; "Passive microwave filter tuning using bond wires"; IET Microwave Antennas Propaganda, vol. 1, No. 3; Jun. 2007.

* cited by examiner

REFLECTIVE MICROSTRIP TUNING CIRCUIT

FIELD OF INVENTION

The present invention relates generally to a tuning circuit, and more particularly to a reflective microstrip tuning circuit such as for use in tuning interferometers, or the like.

BACKGROUND

Detection of ultra-low phase-noise sidebands offset from a carrier often requires the use of interferometers in sophisticated applications such as radar, telecommunications, navigation systems, and the like. Such interferometers typically require precise adjustment of both the amplitude and phase of one or more signals to achieve cancellation, or partial cancellation, of said signals within the interferometric signal processing. Electronic tuning using phase shifters and attenuators, based on active components such as varactor and PIN diodes, adds complexity and, more particularly, often adds an unacceptable amount of electronic noise for these sensitive applications. Passive tuning approaches based on mechanical devices such as line-stretchers and/or rotary vane attenuators are bulky and unsuitable for many applications. Alternative passive tuning approaches have used tuning stubs that must be carefully trimmed by hand, such as with a scalpel, to achieve the desired cancellation of the signal in the interferometer circuitry. Such manual procedures require training and great skill. In an ultra-low phase-noise application, X-band frequencies may be involved, which may require extremely fine manual adjustments to one or more tuning stub lengths as a final solution to required cancellation is approached. Such manual precision often results in over-trimming a tuning stub, which may require the entire circuit board to be scrapped.

SUMMARY OF INVENTION

The present invention provides a passive microstrip tuning circuit that offers high resolution over the complex return plane in both amplitude and phase, allowing repeatable and consistent adjustment to the tuning circuit for approaching a final desired result with a greater degree of accuracy.

More particularly, the tuning circuit is configured as a reflective microstrip tuning circuit that operatively couples to another circuit to be tuned via the tuning circuit, in which tuning circuit receives an incident signal from the other circuit and enables adjustment of the amplitude and/or phase of the return signal which is reflected by the tuning circuit for use in the other circuit. The tuning circuit includes one or more cascaded couplers that divide the power of the incident signal among a plurality of adjustable tuning arms, in which the length of the tuning arms may be individually adjusted to adjust the phase of the individual reflected signals from the tuning arms such that the portion of said individual reflected signals passing back through the couplers are combined to produce the return signal which may be adjusted in both amplitude and phase to achieve the desired tuning result. Moreover, the cascaded couplers may divide the incident power unequally between the tuning arms to provide a progressive weighting to the adjustment effect of each tuning arm, which effectively provides a series of coarse through fine adjustments that enables the user to tune the circuit more easily and with a greater degree of reproducibility and accuracy.

Each tuning arm may be formed as a series of wire-bonded segments, in which plucking of the wire bonds enables a consistent manner of adjusting the length of each tuning arm compared to that of trimming with a scalpel. In addition, with the weighting effect of each tuning arm, more than one combination of tuning arm lengths can lead to an acceptable return signal, allowing for the possibility to recover if one or more of the tuning arms is over-adjusted. As will be understood by those having ordinary skill in the art, the size and spacing of the wire-bonded segments in combination with the number and shape of the wire bonds between segments may be such so as to maintain the characteristic impedance for which the couplers are designed to operate.

In addition, the tuning circuit includes one or more terminators operatively coupled to the one or more cascaded couplers, which enable the tuning circuit to absorb and dissipate power, thus allowing for amplitude control in addition to phase control over the combined return signal.

According to an aspect of the invention, a reflective microstrip tuning circuit includes: a port for receiving an incident signal from another circuit; one or more cascaded couplers configured to split the incident signal; and a plurality of adjustable tuning arms that are configured to receive the split incident signal; wherein the one or more cascaded couplers are configured to split the incident signal such that power associated with the incident signal is divided unequally among the plurality of adjustable tuning arms, such that the dividing of the power results in different weighting effects of the adjustment of each tuning arm.

According to an embodiment of any paragraph(s) of this summary, each of the plurality of tuning arms is configured to reflect at least a portion of the split signal in each tuning arm back to the one or more cascaded couplers.

According to an embodiment of any paragraph(s) of this summary, the tuning circuit further including one or more terminators operatively coupled to the one or more cascaded couplers, the one or more terminators dissipating power in the tuning circuit based on a difference between power associated with the incident signal and power associated with the combined reflected signal.

According to an embodiment of any paragraph(s) of this summary, the one or more cascaded couplers are configured to receive the reflected split signal from the plurality of tuning arms and combine the reflected split signal into a combined reflected signal.

According to an embodiment of any paragraph(s) of this summary, each of the plurality of tuning arms is adjustable to adjust an amplitude and/or phase of the combined reflected signal.

According to an embodiment of any paragraph(s) of this summary, the port is a single port of the tuning circuit that receives the combined reflected signal and sends the combined reflected signal out of the tuning circuit to the other circuit.

According to an embodiment of any paragraph(s) of this summary, each of the cascaded couplers is a branch-line quadrature microstrip coupler that splits the incident signal and provides isolation between split output paths of the incident signal.

According to an embodiment of any paragraph(s) of this summary, the split incident signal includes a plurality of incident signal components, each of the plurality of tuning arms receiving one of the plurality of incident signal components; wherein the respective incident signal components in each of the plurality of tuning arms is reflected by each tuning arm to form respective reflected signal components in each tuning arm; and wherein each of the plurality of tuning arms is adjustable to adjust the phase of the reflected signal component in each tuning arm.

According to an embodiment of any paragraph(s) of this summary, each of the plurality of tuning arms are adjustable by adjusting a length of each tuning arm.

According to an embodiment of any paragraph(s) of this summary, each of the plurality of tuning arms include a plurality of segments that are connected together by wire bonds, in which the wire bonds are pluckable or breakable to effectively adjust the length of the respective tuning arm, thereby adjusting the phase of the reflected signal component in the respective tuning arm.

According to an embodiment of any paragraph(s) of this summary, each of the plurality of tuning arms has a sufficient length to achieve at least 360-degrees of phase change of the reflected signal component at an operating frequency of the incident signal.

According to an embodiment of any paragraph(s) of this summary, the plurality of tuning arms are configured to match the impedance of the tuning circuit.

According to an embodiment of any paragraph(s) of this summary, the one or more terminators are configured to match the impedance of the tuning circuit.

According to an embodiment of any paragraph(s) of this summary, the one or more terminators include resistors.

According to an embodiment of any paragraph(s) of this summary, the tuning circuit includes four tuning arms, and wherein the one or more cascaded couplers are configured to split the power in an 8:4:2:1 ratio among the four tuning arms.

According to an embodiment of any paragraph(s) of this summary, the incident signal is an electromagnetic signal.

According to an embodiment of any paragraph(s) of this summary, the electromagnetic signal is a microwave signal having a frequency in the range of 8.0 GHz to 12.0 GHz.

According to an embodiment of any paragraph(s) of this summary, the other circuit includes an interferometer circuit, an antenna circuit, a filter circuit, or a connector circuit.

According to an embodiment of any paragraph(s) of this summary, the tuning circuit further having a circulator that is configured to direct a reflected signal into a desired path.

According to an aspect of the invention an interferometer includes: an interferometer circuit; and a tuning circuit operatively coupled to the interferometer circuit, the tuning circuit comprising: a port for receiving an incident signal from the interferometer circuit; one or more cascaded couplers configured to split the incident signal; and a plurality of adjustable tuning arms that are configured to receive the split incident signal; wherein the one or more cascaded couplers are configured to split the incident signal such that power associated with the incident signal is divided unequally among the plurality of adjustable tuning arms, such that the dividing of the power results in different weighting effects of the adjustment of each tuning arm; wherein each of the plurality of tuning arms is configured to reflect the split signal in each tuning arm back to the one or more cascaded couplers; and wherein the one or more cascaded couplers are configured to receive the reflected split signal from the plurality of tuning arms and combine the reflected split signal into a combined reflected signal as a return signal that is directed back to the interferometer circuit.

According to another aspect of the invention, a method of tuning a circuit includes: (i) providing a reflective microstrip tuning circuit comprising: a port for receiving an incident signal from the circuit; one or more cascaded couplers configured to split the incident signal; and a plurality of adjustable tuning arms that are configured to receive the split incident signal; wherein the one or more cascaded couplers are configured to split the incident signal such that power associated with the incident signal is divided unequally among the plurality of adjustable tuning arms, such that the dividing of the power results in different weighting effects of the adjustment of each tuning arm; (ii) operatively coupling the microstrip tuning circuit to the circuit via the port; (iii) generating the incident signal and directing the incident signal to the microstrip tuning circuit via the port; (iv) splitting the incident signal via the one or more cascaded couplers, and dividing power associated with the incident signal unequally among the plurality of tuning arms; (v) reflecting the split signal by each tuning arm; (vi) selectively adjusting one or more of the plurality of tuning arms to adjust the reflected split signal in the respective tuning arms; (vii) combining the reflected split signal from each of the plurality of tuning arms via the one or more cascaded couplers to form a combined reflected signal; and (viii) communicating the combined reflected signal via the port to the circuit as a return signal.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles and aspects of the present invention have particular application to reflective microstrip tuning circuits, such as for use in tuning interferometer circuits used in detecting ultra-low phase-noise signals which may be used for radar, telecommunication, navigation systems, or the like, and thus will be described below chiefly in this context. It is understood, however, that the principles and aspects of this invention may be applicable to the tuning of other types of circuits, such as for use with antennas, filters, connectors, or the like, which may operate with electromagnetic signals, such as microwave signals, for example.

Figure 1:
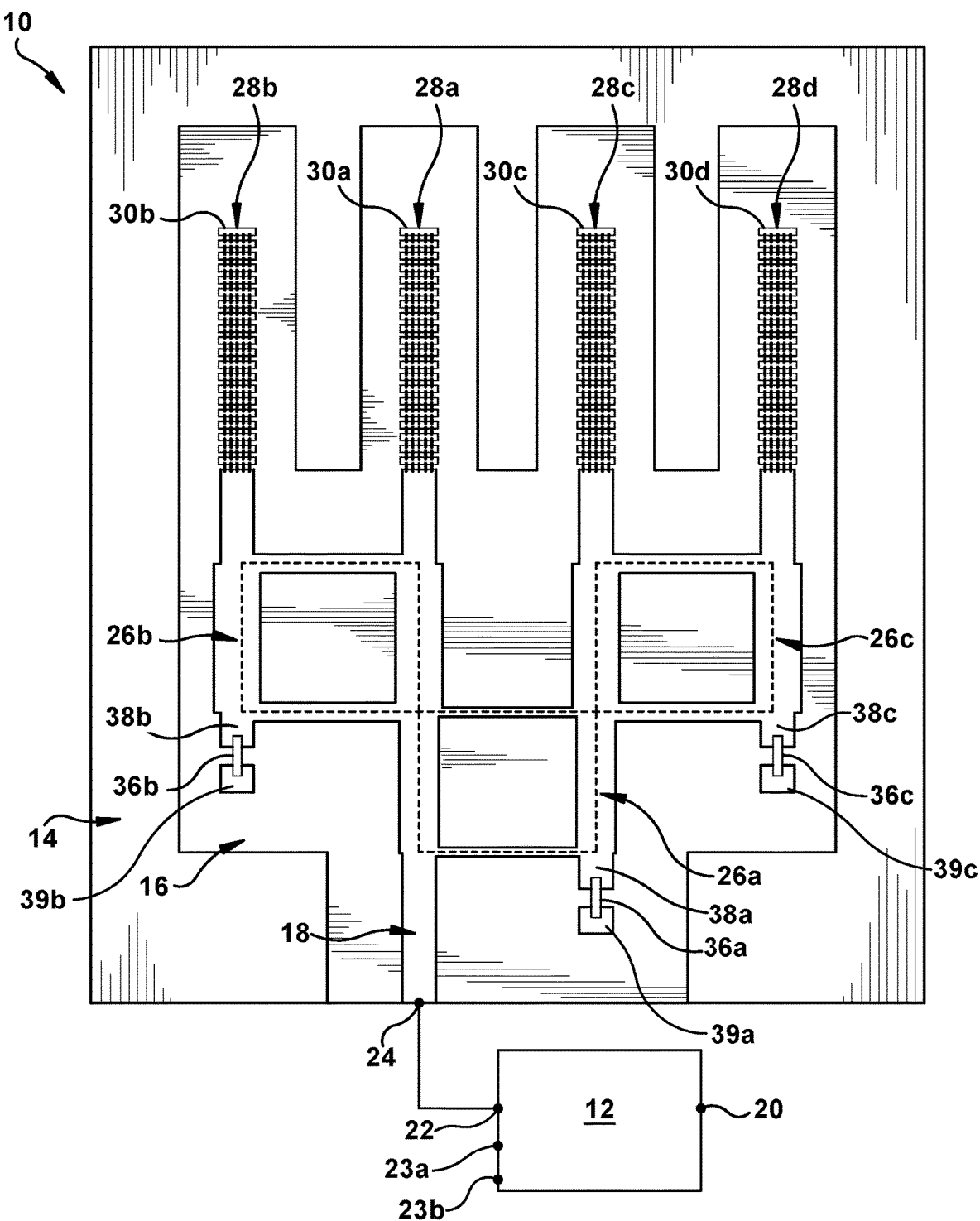
FIG. 1 is a plan view of an exemplary reflective microstrip tuning circuit according to an embodiment of the invention, which is shown connected to another circuit.
Figure 2:
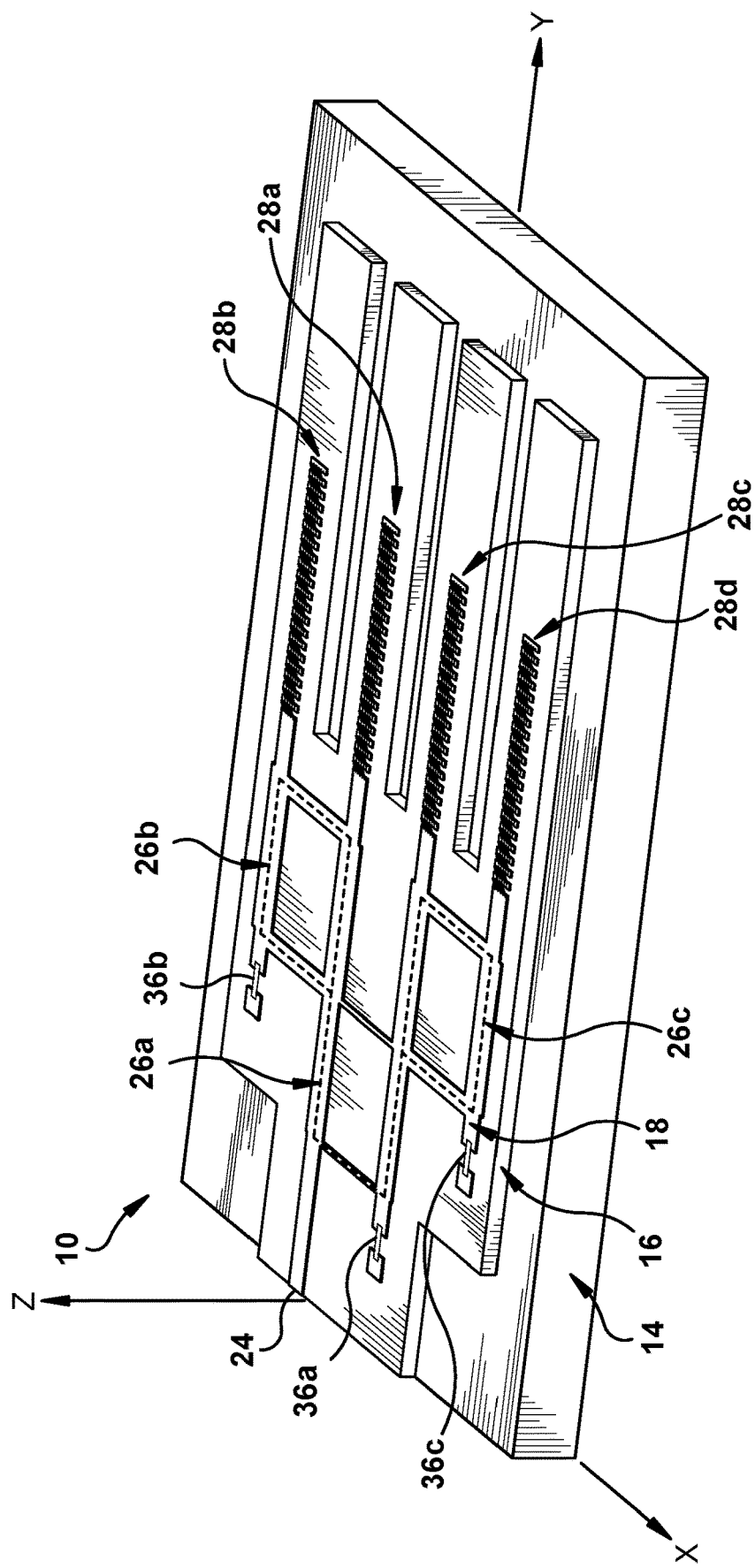
FIG. 2 is an oblique view of the reflective microstrip tuning circuit shown without connection to the other circuit.
Figure 3:
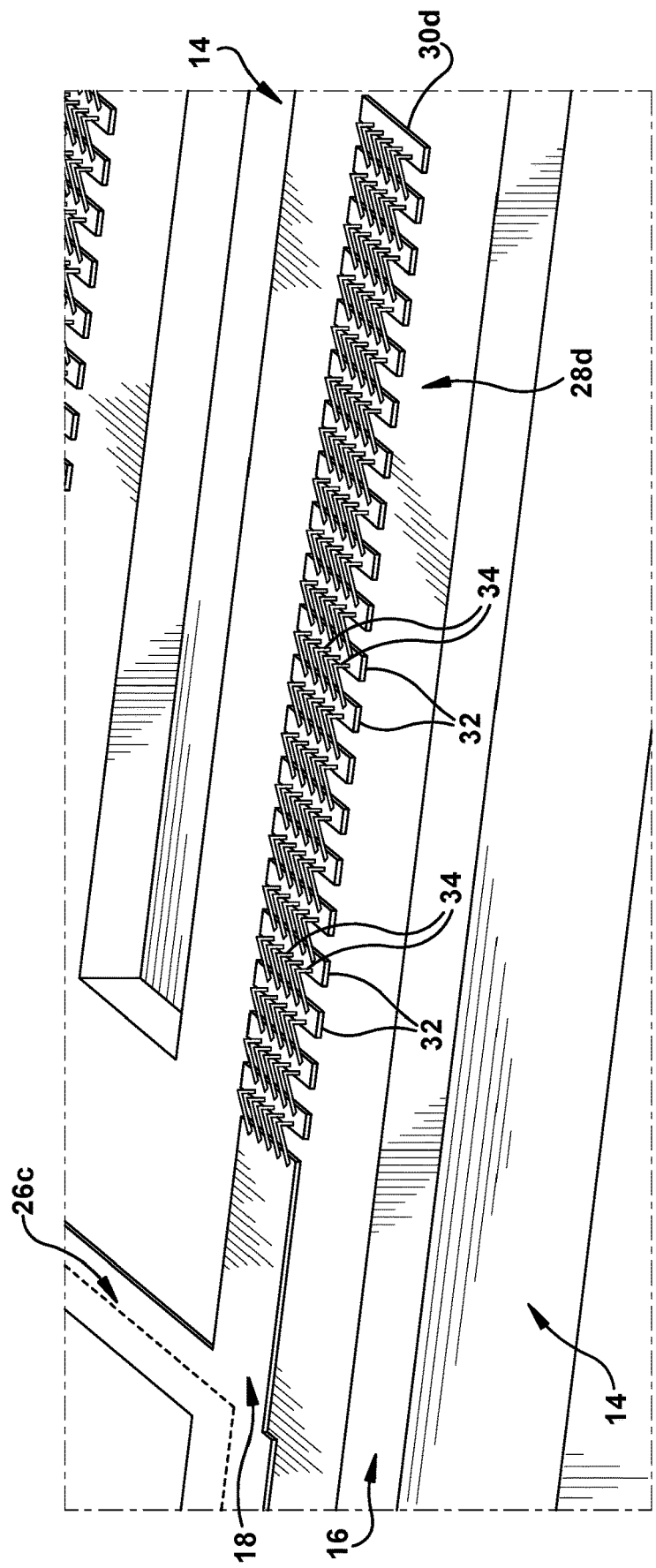
FIG. 3 is an enlarged oblique view of a portion of the reflective microstrip tuning circuit.

Referring to FIGS. 1-3, an exemplary reflective microstrip tuning circuit 10 is shown. In the illustrated embodiment, the reflective microstrip tuning circuit 10 (also referred to as the tuning circuit 10) is operatively connected to a circuit 12 that is to be tuned passively through adjustment of the tuning circuit 10, as described in further detail below. As shown, the microstrip construction of the tuning circuit 10 generally includes a ground plane 14, a dielectric layer 16 on top of the ground plane 14, and a conductive trace 18, or conductor, on top of the dielectric layer 16, which forms a conduction path for transmitting a signal, such as an electromagnetic signal (e.g., a microwave-frequency signal), through the tuning circuit 10.

In exemplary embodiments, the circuit 12 is an interferometer circuit (also referred to with reference numeral 12) for an interferometer that is to be tuned using the tuning circuit 10. Generally, an interferometer makes use of the principle of superposition to combine waves, such as electromagnetic waves, in a way that will cause the result of their combination to have some meaningful property that is diagnostic of the original state of the waves. In interferometers used for detection of ultra-low phase-noise sidebands offset from a carrier, it is typical to combine two signals, wherein the carriers are identical in amplitude but the sidebands are different. Combining two such signals, with their carriers out-of-phase, results in cancellation of the carriers leaving a residual signal being the combination of the sidebands of the two original signals, said residual signal may then be amplified to a greater extent than would be possible in the presence of a significant carrier signal. Other applications may combine signals in a different manner wherein the amplitude and/or phase of one or more of said signals must be adjusted to extract information about the signals or to achieve an otherwise-desired result as would be understood by those having ordinary skill in the art.

In exemplary embodiments as described here, the interferometer circuit 12 can receive two signals at ports 23a and 23b, each signal comprising a carrier and sidebands. In addition, the interferometer 12 will have a dark port 20 and at least one bright port 22. Cancellation, or partial cancellation, of the carrier signals entering the interferometer at 23a and 23b, occurs at the dark port 20. Those having ordinary skill in the art will understand that said cancellation does not imply a destruction of carrier power and that a remainder of the total carrier power entering 12 at 23a and 23b, not exiting at the dark port 20, must be directed elsewhere in the circuit, in this case to a bright port 22. In exemplary embodiments, the residual signal exiting the interferometer circuit 12 at the dark port 20 may be sent to further circuits, not shown, wherein the residual signal may be amplified or further processed to allow detection of ultra-low phase-noise sidebands in the microwave frequency range, such as in the X band frequency range (e.g., 8.0 GHz to 12.0 GHz). Generally, remaining carrier power exiting a bright port of an interferometer used for ultra-low phase-noise detection as described here, is not utilized and is absorbed in a resistive termination. However, as those having ordinary skill in the art will understand, any carrier power reflected back into the bright port 22 from tuning circuit 10 may be redirected by means within the interferometer so as to adjust the summation of signals at the dark port 20 of interferometer circuit 12, thereby providing a means of adjusting the level of cancellation by adjusting the tuning circuit 10 independently of any adjustment means that may be incorporated in the interferometer 12.

Ultra-low phase-noise interferometric applications typically require precise adjustment of both the amplitude and phase of at least one electromagnetic signal to achieve cancellation or partial cancellation. The exemplary tuning circuit 10 may be utilized to achieve this desired result in combination with the interferometer circuit 12. As shown in the illustrated embodiment, for example, the tuning circuit 10 may be operatively connected to the bright port 22 of the interferometer circuit 12, in which the tuning circuit 10 is utilized to adjust the signal returned to the bright port 22 to provide the desired degree of out-of-phase cancellation at the dark port 20 of the interferometer circuit 12. Generally, the tuning circuit 10 accomplishes this by receiving an incident signal from the bright port 22 and reflects a return signal back through the bright port 22, in which selective adjustment of the tuning circuit 10 changes the amplitude and/or phase of the return signal to achieve the desired cancellation of the waves in the interferometer circuit 12, as described in further detail below.

In exemplary embodiments, the tuning circuit 10 is operatively connected to the interferometer circuit 12 for providing the desired adjustment of the circuit 12, in which the tuning circuit 10 remains in place after the adjustment when the interferometer is utilized in the field. The microstrip construction of the tuning circuit 10 enhances the compactness of the design for enabling the tuning circuit 10 to remain in place. Moreover, the passive nature of the tuning circuit 10 enhances its compactness and eliminates active device noise, which is an advantage over active tuning approaches, as discussed above. The microstrip tuning circuit 10 generally provides enhanced resolution over the complex return plane in both amplitude and phase, allowing repeatable and consistent adjustment to the tuning circuit 10 for approaching a final desired result with a greater degree of accuracy, as discussed in further detail below.

As shown, the tuning circuit 10 generally includes a port 24 for receiving an incident signal from the other circuit 12 (e.g., an electromagnetic signal via the bright port 22 of the interferometer circuit 12). The tuning circuit 10 also includes one or more cascaded couplers 26a, 26b, 26c (collectively referred to with reference numeral 26) that are located downstream of the port 24, in which the cascaded couplers 26 are configured to split the incident signal among a plurality of adjustable tuning arms 28a, 28b, 28c, 28d (collectively referred to with reference numeral 28). Generally, the plurality of tuning arms 28 are configured to receive the split incident signal from the cascaded couplers 26, and are configured to reflect the split signal in each tuning arm 28 back to the one or more cascaded couplers 26. The cascaded couplers 26 are configured to combine the reflected split signal from each tuning arm 28 into a combined reflected signal that is directed back through the port 24 as a return signal for use in the circuit 12 (e.g., interferometer circuit). As described in further detail below, adjustment of each tuning arm 28 results in a change of phase of the reflected split signal from each arm 28, in which this adjustment is utilized to achieve the desired return signal to the circuit 12, such as for providing the desired phase shift and/or amplitude change of the return signal to achieve the desired level of cancellation or partial cancellation of the waves at the dark port 20 of the interferometer circuit 12, for example.

To provide a greater degree of reproducibility and accuracy in the tuning technique, the cascaded couplers 26 are configured to split the incident signal coming from the circuit 12 such that power associated with the incident signal is divided unequally among the plurality of adjustable tuning arms 28. The dividing of power among the tuning arms 28 in this manner results in different weighting effects of the adjustment of each tuning arm 28. This essentially provides a series of coarse through fine adjustments depending on the power division associated with each tuning arm 28.

In the illustrated embodiment, for example, the cascaded couplers 26 are configured to provide the first tuning arm 28a with the greatest ratio of the divided power compared to that of the other tuning arms 28b, 28c, and 28d, such that the first tuning arm 28a provides a coarser amount of adjustment of the reflected signal. The fourth tuning arm 28d, on the other hand, may be provided with the lowest ratio of the divided power among the tuning arms 28, such that the fourth tuning arm 28d provides a very fine amount of adjustment of the reflected signal. The second and third tuning arms 28b and 28c may be provided with different intermediate ratios of the divided power between the first and fourth tuning arms 28a and 28d, thereby providing a medium and fine amount of adjustment, for example. In this manner, coarse through fine adjustments are provided by individual adjustment of the respective tuning arms 28a, 28b, 28c, 28d. A person having ordinary skill in the art will understand that there will be a minimum practical size of pad and wire-bond that may be achieved with a given level of technology. The provision of coarse through fine adjustment allows for a resolution much greater than that which could be achieved based on this minimum practical size.

In the illustrated embodiment, three cascaded couplers 26a, 26b, 26c are provided for splitting the incident signal from the port 24 among the four tuning arms 28a, 28b, 28c, 28d. As shown, each of the cascaded couplers 26 is a branch-line quadrature microstrip coupler that splits the incident signal and provides isolation between the split output paths based upon the length and width of the conductive traces 18 forming the coupler 26 in a manner well known in the art. In the illustrated embodiment, for example, the first cascaded coupler 26a splits the incident signal from the port 24 into two incident signal components, in which these two incident signal components are further split downstream by the cascaded couplers 26b and 26c into four incident signal components. The cascaded couplers 26 and the tuning arms 28 are configured such that each tuning arm 28a-d receives one of the incident signal components caused by the splitting of the cascaded couplers 26a-c but substantially none of the signal reflected by the other arms 28a-d.

As discussed above, the cascaded couplers 26 divide power associated with the incident signal unequally among the plurality of tuning arms 28. The term "unequally" as used herein means a combination of couplers 26 which provides at least a 2:1 difference in the weighting between the coarsest and finest arms 28, such as illustrated by the following calculations. In the illustrated embodiment, for example, the first coupler 26a splits the power in the ratio 4:1 between couplers 26b and 26c. Couplers 26b and 26c each provide a 2:1 power split, so that the first arm 28a receives $2/3 \times 4/5 = 8/15$ of the incident power, arm 28b receives $1/3 \times 4/5 = 4/15$, arm 28c receives $2/3 \times 1/5 = 2/15$ and arm 28d receives $1/3 \times 1/5 = 1/15$. The power is thereby divided in an 8:4:2:1 ratio among the tuning arms 28a, 28b, 28c and 28d, respectively and the ratio between coarsest and finest arms is 8:1.

It is understood that the foregoing power division ratio of 8:4:2:1 provided by the configuration of the cascaded couplers 26 is exemplary, and that the cascaded couplers 26 may be configured to provide different divisions of power depending on the degree of adjustment desired for each tuning arm 28, as would be understood by those having ordinary skill in the art. It is furthermore understood that although three cascaded couplers 26a-c and four tuning arms 28a-d are shown in the illustrated embodiment, some exemplary embodiments may have greater or fewer than three cascaded couplers 26, and/or greater or fewer than four tuning arms 28, as may be desirable depending on the desired weighting effect of tuning provided by each tuning arm 28. For example, additional cascaded couplers 26 with corresponding additional tuning arms 28 could be added to the tuning circuit 10 for increased resolution in the tuning of the tuning circuit 10, however four such tuning arms 28 may be practical for a wide variety of applications.

The split incident signal provided by the cascaded couplers 26 can be characterized as a plurality of incident signal components having different amplitudes based upon the power division ratio provided by the cascaded couplers 26. Each tuning arm 28a-d receives one of the plurality of incident signal components such that each tuning arm 28a-d has a different weighting effect when adjusted based at least in part on the amplitude of the incident signal component received in that tuning arm 28a-d. Each tuning arm 28a-d is configured to reflect at least a portion of the incident signal component to form respective reflected signal components in each tuning arm 28a-d. In this manner, adjustment of the respective tuning arms 28a-d, such as by adjusting the length of each tuning arm 28a-d, changes the time delay of the reflected signal component in each tuning arm 28a-d, which therefore adjusts the phase of the reflected signal component in each tuning arm 28a-d. The cascaded couplers 26a-c are configured to combine the reflected (adjusted) signal components from each of the tuning arms 28a-d into a combined reflected signal having an adjusted amplitude and/or phase that is then directed back through the port 24 as a return signal for use in the circuit 12. As described in further detail below with exemplary reference to the voltage phasor diagram in FIG. 4, the combined effect of adjusting the reflected signal components in each tuning arm 28a-d with the different weighting effects enables the respective tuning arms 28a-d to be individually adjusted (e.g., shortened) until a desired amplitude and/or phase of the combined reflected signal for returning to the circuit 12 is achieved.

As best shown in FIG. 3, in exemplary embodiments each of the tuning arms 28a-d includes a plurality of segments 32, or pads, that are connected together by wire bonds 34. The wire bonds 34 are removable from the segments 32, such as by plucking or breaking the wire bonds 34, which effectively shortens the length of the respective tuning arms 28a-d, thereby enabling the phase of the reflected signal component in the respective tuning arm 28a-d to be adjusted by virtue of the time delay caused by the shortening the respective tuning arm 28a-d. Generally, the respective portions of the tuning circuit 10 (e.g., port 24, cascaded couplers 26, and/or segments 32 of the tuning arms 28) are formed via the conductive trace 18 being deposited and/or etched on the dielectric layer 16 of the microstrip construction. In the illustrated embodiment, each of the four tuning arms 28a, 28b, 28c, 28d includes twenty segments 32, which provides 160,000 possible plucked combinations. The number of segments 32 per tuning arm 28 may be limited by the practicality of etching the segments 32, the size of the wire bonds 34, and the length of each tuning arm 28a-d. It is understood that although wire bonded segments 32 may be a preferred approach for providing the desired adjustment, the tuning arms 28a-d may be provided in other configurations such as continuous traces that may be trimmed with an instrument, such as a scalpel or the like.

In the illustrated embodiment, each of the respective tuning arms 28a-d has the same geometric configuration, although it is understood that one or more of the tuning arms 28a-d may be different, provided that the tuning arms are configured to match the impedance of the tuning circuit 10 (e.g., 50 ohms). In the illustrated embodiment, the width of the segments 32 in each tuning arm 28a-d are wider than a width of the respective portions of the conductive trace 18 upstream of the segments 32 so as to provide the desired impedance matching with the tuning circuit 10 when combined with the inductance of the wire bonds 34. In exemplary embodiments, each of the tuning arms 28a-d also is configured to have sufficient length to achieve at least 360-degrees of phase change of the reflected signal component at an operating frequency of the incident signal (e.g., X-band frequencies in the range of about 8.0-12.0 GHz). In the illustrated embodiment, the tuning arms 28a-d have an open circuit configuration in which the incident signal components are reflected off ends 30a-d of each tuning arm 28a-d. It is understood, however, that the tuning circuit 10 could be utilized with short circuit tuning arms 28a-d in which the wire bonds 32 could be shunted to a nearby ground plane, in which case the arms 28a-d would be electrically lengthened by plucking or breaking of the wire bonds in order from the end closest to the couplers 26. In yet another configuration the tuning arms 28 may be continuous microstrip tracks terminated by a matched resistor, in which configuration the reflected signal component may be a portion of the incident signal component generated by operatively connecting the continuous microstrip track to a nearby ground plane at some distance along the arm 28. In such a configuration, both the amplitude and phase of the individual reflected signal in a tuning arm 28 may be adjusted by utilizing operative connections of different impedance in combination with placement of said connections at different distances along the arm thereby providing a higher resolution of adjustment as may be required in some applications.

As shown in the illustrated embodiment, the turning circuit 10 further includes one or more terminators 36a, 36b, 36c (collectively referred to with reference numeral 36) that are operatively coupled to the one or more cascaded couplers 26. The terminators 36 absorb and dissipate power in the tuning circuit 10 based on a difference between power associated with the incident signal and power associated with the reflected signal being combined by the cascaded couplers 26. In the illustrated embodiment, the terminators 36a, 36b, 36c are resistors that are configured to match the impedance of the tuning circuit 10 (e.g., 50 ohm resistors). As shown, one end of the terminators 36a, 36b, 36c is coupled to isolated ports 38a, 38b, 38c of each cascaded coupler 26a, 26b, 26c, and the other end is connected to pads, 39a, 39b, 39c in electrical contact with ground plane 14 such that any additional power associated with the reflected signal that is not returned to the port 24 is directed to the terminators 36 and dissipated. The pads 39a-c may be grounded by conducting vias through the dielectric layer 16, by open-circuit quarter-wave arms, or other such means as is convenient or desirable.

In exemplary embodiments, the port 24 is the only port of the tuning circuit 10 that communicates with the circuit 12 to receive the incident signal as an input to the tuning circuit 10, and to receive the combined reflected signal from the cascaded couplers 26 as an output return signal that is communicated back to the circuit 12.

Figure 4:
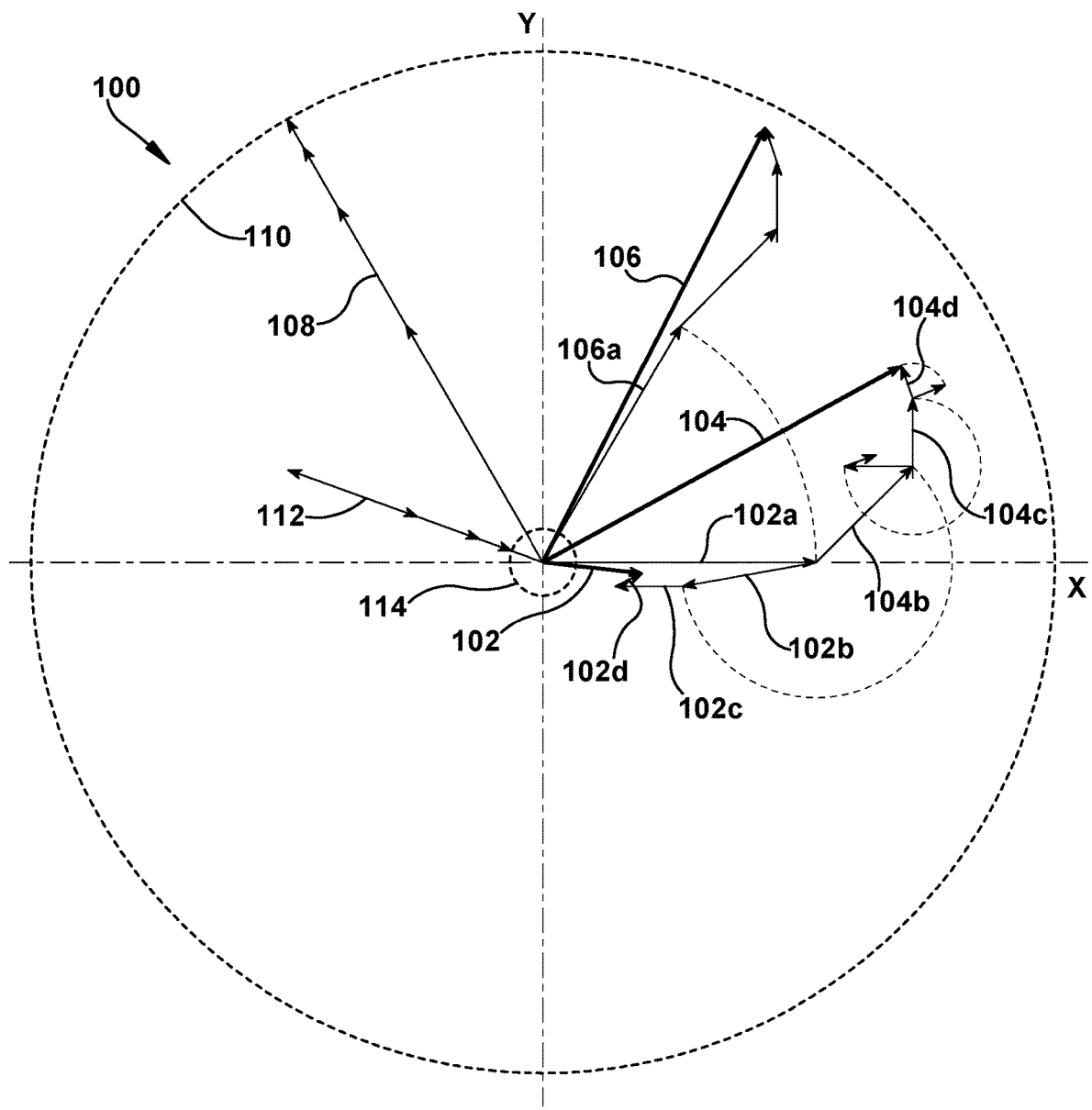
FIG. 4 is an exemplary voltage phasor diagram illustrating an exemplary operation of adjusting the reflective microstrip tuning circuit.

Referring to FIG. 4, an exemplary voltage phasor diagram 100 illustrating an exemplary operation of adjusting the reflective microstrip tuning circuit 10 is shown. In the illustrated embodiment, the voltage phasor diagram 100 is used to express the amplitude and phase of the respective reflected signal components in each tuning arm 28a-d, which illustrates how the tuning circuit 10 may be adjusted to achieve the desired amplitude and/or phase change of the combined reflected signal as a return signal when combined via the cascaded couplers 26.

As discussed above, in the illustrated embodiment the power associated with the incident signal is divided by the three cascaded couplers 26a, 26b, 26c in an 8:4:2:1 ratio to the tuning arms 28a, 28b, 28c and 28d, respectively. Upon reflecting off the ends 30a-d of the tuning arm stubs, the power associated with the split reflected signal is again split by the same ratio, resulting in a return power ratio of 64:16:4:1. In the exemplary voltage phasor diagram 100, voltage is proportional to the square-root of power, which means the return voltages of the respective reflected signal components are in an 8:4:2:1 ratio, as shown.

The initial condition of the unadjusted (e.g., unplucked) tuning arms 28a-d is shown by phasors 102a-d in the voltage phasor diagram 100. The alignment of phasors 102a-d is illustrative only and has been adjusted for clarity rather than accuracy. In the illustrated embodiment, the quadrature nature of the cascaded couplers 26 means that the reflected signal components from the second and third tuning arms 28b and 28c represented by phasors 102b and 102c have an additional 180-degrees of phase shift compared with phasors 102a and 102d being representative of the reflected signals from first and fourth tuning arms 28a and 28d. Phasor 102 shows the vector sum of phasors 102a-d, representing the combined reflected signals exiting port 24. Phasor 104 shows a different combined reflected signal comprising the summation of phasors 102a, 104b, 104c and 104d. Phasor 102a being the unadjusted reflected signal from tuning arm 28a, phasors 104b-d showing the effect of rotating phasors 102b-d by approximately 210-degrees, 270-degrees and 90-degrees respectively by shortening tuning arms 28b-d by different amounts. Phasor 106 shows another possible reflected signal wherein tuning arm 28a has been shortened to rotate phasor 102a to the position shown as 106a in combination with the same phasors 104b-d as previously described. Phasors 108 illustrate a combination wherein the phasors representing reflected signals from tuning arms 28a-d are aligned at an arbitrary phase angle, and circle 110 represents an approximate outer boundary of possible return signal phasor end points. Similarly, phasors 112 are aligned to illustrate a return signal with minimum amplitude and circle 114 shows an approximate inner boundary of return signal phasors. It is understood that the foregoing adjustment combinations shown at 102, 104 and 106 are exemplary, and that the tuning circuit 10 may adjust each reflected signal component by individually adjusting each tuning arm 28a-d in any suitable manner to achieve the desired return signal at the port 24. Any return signal phasor ending between bounding circles 110 and 114 may be generated with a high degree of resolution determined principally by the weighting factor of tuning arm 28d and the spacing between pads 34.

As shown, the phasor 102a associated with the first tuning arm 28a has the greatest amplitude compared to the other reflected signal components (as illustrated by the relative length of phasor 102a), which is caused by the 8:4:2:1 power split ratio provided by the cascaded couplers 26. As such, the adjustment of the first tuning arm 28a has a greater weighting effect on the adjustment of the combined reflected signal as a return signal (e.g., the rotation of phasor 102a to position 106a moves the combined return signal from 104 to 106 being a relatively large distance as shown). In this manner, the first tuning arm 28a may be utilized for relatively coarse adjustments of the combined reflected signal. The fourth tuning arm 28d, on the other hand, has the least weighting effect by virtue of the 8:4:2:1 power split ratio, as illustrated by the relatively shorter length of the phasor 104d, and thus is utilized to provide very fine adjustments to the achieve the desired combined reflected signal. The third and fourth tuning arms 28b, 28c have intermediate weighting effects as illustrated by their respective phasors 104b, 104c, and thus are utilized for medium and fine tuning adjustments, respectively.

As shown, the combination of reflected signal components shown at 102, 104 and 106 have significantly different amplitudes representative of different levels of power returned via port 24. The tuning circuit 10 is configured to steer the power associated with the combined reflected signal as adjusted to the port 24, and is configured to steer any additional power in the circuit 10 to the terminators 36 to absorb and dissipate this power. The terminators 36 thus enable the tuning circuit 10 to provide amplitude control in addition to phase control over the combined reflected signal as a return signal at the port 24.

An exemplary reflective microstrip tuning circuit has been described herein. The tuning circuit is configured to operatively couple to another circuit to be tuned, in which tuning circuit receives an incident signal from the other circuit and enables adjustment of the amplitude and/or phase of the return signal reflected by the tuning circuit for use in the other circuit. The tuning circuit includes one or more cascaded couplers that divide power from the incident signal unequally among a plurality of adjustable tuning arms, in which the tuning arms may be individually adjusted to change the amplitude and/or phase of the return signal that is reflected by the arms to achieve the desired tuning result. The difference in the power that is divided between the tuning arms provides a progressive weighting to the adjustment effect of each tuning arm, which provides a series of coarse through fine adjustments that enables a greater degree of resolution. Tuning arms comprising a series of pads connected by wire bonds provide for a high degree of reproducibility.

The exemplary tuning circuit may be used for tuning interferometer circuits, which may be used in ultra-low phase-noise detection applications such as oscillators, radar, telecommunication, navigation systems, or the like. The tuning circuit also may be utilized with other microstrip circuits requiring a greater degree of precision and control in the reflective tuning. For example, the tuning circuit may be utilized for tuning antenna circuits, filter circuits, connector matching circuits, or the like. In some embodiments, the tuning circuit may include a circulator for steering the combined reflected signal into a desired path to extend the range of applications.

As used herein, an "operative connection," or a connection by which entities are "operatively connected," is one in which the entities are connected in such a way that the entities may perform as intended. An operative connection may be a direct connection or an indirect connection in which an intermediate entity or entities cooperate or otherwise are part of the connection or are in between the operatively connected entities. An "operative connection" is one in which signals, physical communications, or logical communications may be sent or received. Typically, an operative connection includes a physical interface, an electrical interface, or a data interface, but it is to be noted that an operative connection may include differing combinations of these or other types of connections sufficient to allow operative control.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A reflective microstrip tuning circuit, comprising:
a port for receiving an incident signal from another circuit;
one or more cascaded couplers configured to split the incident signal; and
a plurality of adjustable tuning arms that are configured to receive the split incident signal;
wherein the one or more cascaded couplers are configured to split the incident signal such that power associated with the incident signal is divided unequally among the plurality of adjustable tuning arms, such that the dividing of the power results in different weighting effects of the adjustment of each tuning arm;
wherein each of the plurality of tuning arms is configured to reflect at least a portion of the split signal in each tuning arm back to the one or more cascaded couplers;
wherein the one or more cascaded couplers are configured to receive the reflected split signal from the plurality of tuning arms and combine the reflected split signal into a combined reflected signal; and
wherein the tuning circuit further includes one or more terminators operatively coupled to the one or more cascaded couplers, the one or more terminators dissipating power in the tuning circuit based on a difference between power associated with the incident signal and power associated with the combined reflected signal.

2. The tuning circuit according to claim 1, wherein each of the plurality of tuning arms is adjustable to adjust an amplitude and/or phase of the combined reflected signal.

3. The tuning circuit according to claim 1, wherein the port is a single port of the tuning circuit that receives the combined reflected signal and sends the combined reflected signal out of the tuning circuit to the other circuit.

4. The tuning circuit according to claim 1,
wherein each of the one or more cascaded couplers is a branch-line quadrature microstrip coupler that splits the incident signal and provides isolation between split output paths of the incident signal.

5. The tuning circuit according to claim 1,
wherein the split incident signal includes a plurality of incident signal components, each of the plurality of tuning arms receiving one of the plurality of incident signal components;
wherein the respective incident signal components in each of the plurality of tuning arms is reflected by each tuning arm to form respective reflected signal components in each tuning arm; and
wherein each of the plurality of tuning arms is adjustable to adjust a phase of the reflected signal component in each tuning arm.

6. The tuning circuit according to claim 5, wherein each of the plurality of tuning arms is adjustable by adjusting a length of each tuning arm.

7. The tuning circuit according to claim 6, wherein each of the plurality of tuning arms include a plurality of segments that are connected together by wire bonds, in which the wire bonds are pluckable or breakable to effectively adjust the length of the respective tuning arm, thereby adjusting the phase of the reflected signal component in the respective tuning arm.

8. The tuning circuit according to claim 5, wherein each of the plurality of tuning arms has a sufficient length to achieve at least 360-degrees of phase change of the reflected signal component at an operating frequency of the incident signal.

9. The tuning circuit according to claim 1,
wherein the plurality of tuning arms are configured to match the impedance of the tuning circuit; and/or
wherein the one or more terminators are configured to match the impedance of the tuning circuit.

10. The tuning circuit according to claim 1, wherein the one or more terminators include resistors.

11. The tuning circuit according to claim 1, wherein the incident signal is an electromagnetic signal.

12. The tuning circuit according to claim 11, wherein the electromagnetic signal is a microwave signal having a frequency in the range of 8.0 GHz to 12.0 GHz.

13. The tuning circuit according to claim 1, wherein the other circuit includes an interferometer circuit, an antenna circuit, a filter circuit, or a connector circuit.

14. A reflective microstrip tuning circuit, comprising:
a port for receiving an incident signal from another circuit;
one or more cascaded couplers configured to split the incident signal; and
a plurality of adjustable tuning arms that are configured to receive the split incident signal;
wherein the one or more cascaded couplers are configured to split the incident signal such that power associated with the incident signal is divided unequally among the plurality of adjustable tuning arms, such that the dividing of the power results in different weighting effects of the adjustment of each tuning arm; and
wherein the tuning circuit includes four tuning arms, and wherein the one or more cascaded couplers are configured to split the power in an 8:4:2:1 ratio among the four tuning arms.

15. An interferometer comprising:
an interferometer circuit; and
a tuning circuit operatively coupled to the interferometer circuit, the tuning circuit comprising:
a port for receiving an incident signal from the interferometer circuit;
one or more cascaded couplers configured to split the incident signal; and
a plurality of adjustable tuning arms that are configured to receive the split incident signal;
wherein the one or more cascaded couplers are configured to split the incident signal such that power associated with the incident signal is divided unequally among the plurality of adjustable tuning arms, such that the dividing of the power results in different weighting effects of the adjustment of each tuning arm;
wherein each of the plurality of tuning arms is configured to reflect the split signal in each tuning arm back to the one or more cascaded couplers;
wherein the one or more cascaded couplers are configured to receive the reflected split signal from the plurality of tuning arms and combine the reflected split signal into a combined reflected signal as a return signal that is directed back to the interferometer circuit; and
wherein the tuning circuit further includes one or more terminators operatively coupled to the one or more cascaded couplers, the one or more terminators dissipating power in the tuning circuit based on a difference between power associated with the incident signal and power associated with the combined reflected signal.

16. A method of tuning a circuit, comprising:
providing a reflective microstrip tuning circuit comprising: a port for receiving an incident signal from the circuit; one or more cascaded couplers configured to split the incident signal; and a plurality of adjustable tuning arms that are configured to receive the split incident signal; wherein the one or more cascaded couplers are configured to split the incident signal such that power associated with the incident signal is divided unequally among the plurality of adjustable tuning arms, such that the dividing of the power results in different weighting effects of the adjustment of each tuning arm;
operatively coupling the microstrip tuning circuit to the circuit via the port;
generating the incident signal and directing the incident signal to the microstrip tuning circuit via the port;
splitting the incident signal via the one or more cascaded couplers, and dividing power associated with the incident signal unequally among the plurality of tuning arms;
reflecting the split signal by each tuning arm;
selectively adjusting one or more of the plurality of tuning arms to adjust the reflected split signal in the respective tuning arms;
combining the reflected split signal from each of the plurality of tuning arms via the one or more cascaded couplers to form a combined reflected signal;
dissipating power in the tuning circuit via one or more terminators operatively coupled to the one or more cascaded couplers, wherein the dissipating power is based on a difference between power associated with the incident signal and power associated with the combined reflected signal; and
communicating the combined reflected signal via the port to the circuit as a return signal.

* * * * *